United States Patent
Liu et al.

(10) Patent No.: US 12,075,292 B2
(45) Date of Patent: Aug. 27, 2024

(54) HANDOVER METHOD, HANDOVER DEVICE AND COMPUTER READABLE STORAGE MEDIUM

(71) Applicant: DATANG MOBILE COMMUNICATIONS EQUIPMENT CO., LTD., Beijing (CN)

(72) Inventors: Aijuan Liu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 549 days.

(21) Appl. No.: 17/287,995

(22) PCT Filed: Sep. 3, 2019

(86) PCT No.: PCT/CN2019/104198
§ 371 (c)(1),
(2) Date: Apr. 23, 2021

(87) PCT Pub. No.: WO2020/082903
PCT Pub. Date: Apr. 30, 2020

(65) Prior Publication Data
US 2021/0385705 A1    Dec. 9, 2021

(30) Foreign Application Priority Data
Oct. 23, 2018  (CN) .......................... 201811234791.9

(51) Int. Cl.
*H04W 36/00* (2009.01)
*H04W 76/15* (2018.01)

(52) U.S. Cl.
CPC ... *H04W 36/0069* (2018.08); *H04W 36/0058* (2018.08); *H04W 36/0079* (2018.08); *H04W 76/15* (2018.02)

(58) Field of Classification Search
CPC ......... H04W 36/0069; H04W 36/0058; H04W 36/0079; H04W 76/15
See application file for complete search history.

(56) References Cited

U.S. PATENT DOCUMENTS 9,526,044 B2    12/2016    Choi et al.
2014/0133465 A1*   5/2014   Johansson ............. H04W 76/18
                                                       370/332
(Continued)

FOREIGN PATENT DOCUMENTS

CN        103096391 A      5/2013
CN        104735638 A      6/2015
(Continued)

OTHER PUBLICATIONS

3GPP TR 36.875 V13.1.0, 3rd Generation Partnership Project;Technical Specification Group Radio Access Network; Evolved Universal Terrestrial Radio Access Network (E-UTRAN); Extension of dual connectivity in E-UTRAN (Release 13), total 37 pages, Sep. 2015.
(Continued)

*Primary Examiner* — Deepa Belur
(74) *Attorney, Agent, or Firm* — Kilpatrick Townsend & Stockton LLP

(57) ABSTRACT

The present application relates to the field of communications, and disclosed are a handover method, a handover device and a computer readable storage medium. In the embodiments of the present application, by means of carrying first indication information in a handover request message sent by a base station where a source cell is located to a base station where a target cell is located, a recommendation may be provided to the target cell when determining whether to establish a dual connection, so that when the current cell handover is relatively urgent, cell handover may be immediately carried out by preventing the target cell from
(Continued)

establishing the dual connection, reducing the probability of handover failure, and improving the user experience.

15 Claims, 7 Drawing Sheets

(56) References Cited

U.S. PATENT DOCUMENTS

| | | | | |
|---|---|---|---|---|
| 2017/0181044 | A1* | 6/2017 | Wen | H04W 76/34 |
| 2018/0014237 | A1* | 1/2018 | Xu | H04W 76/10 |
| 2018/0302827 | A1* | 10/2018 | Mitsui | H04W 76/15 |
| 2018/0368005 | A1* | 12/2018 | Fukui | H04W 74/0833 |
| 2019/0089447 | A1* | 3/2019 | Sang | H04W 36/00837 |
| 2019/0098684 | A1* | 3/2019 | Tamura | H04W 76/14 |
| 2019/0132782 | A1* | 5/2019 | Kim | H04W 76/10 |
| 2020/0037208 | A1* | 1/2020 | Futaki | H04W 76/15 |
| 2022/0030442 | A1* | 1/2022 | Laghate | H04W 76/15 |

FOREIGN PATENT DOCUMENTS

| | | | |
|---|---|---|---|
| CN | 104822169 | A | 8/2015 |
| CN | 104823481 | A | 8/2015 |
| CN | 106162771 | A | 11/2016 |
| CN | 106471858 | A | 3/2017 |
| CN | 107872851 | A | 4/2018 |
| EP | 2975893 | A | 1/2016 |
| WO | 2014097743 | A1 | 6/2014 |
| WO | 2016114623 | A1 | 7/2016 |
| WO | 2016140757 | A1 | 9/2016 |
| WO | WO-2016180157 | A1 * | 11/2016 ............ H04W 36/08 |

OTHER PUBLICATIONS

Samsung, "Basic Singalling flow and mobility Scenarios in Dual Connectivity", 3GPP TSG-RAN WG3 #83, Prague, Czech Republic, Feb. 10-14, 2014, total 3 pages, R3-140143.

Qualcomm Incorporated, "NR 0ms Interruption HO", 3GPP TSG-RAN WG2 Meeting #101, Athens, Greece, Feb. 26-Mar. 2, 2018, total 8 pages, R2-1803662.

* cited by examiner

HANDOVER METHOD, HANDOVER DEVICE AND COMPUTER READABLE STORAGE MEDIUM

CROSS-REFERENCE OF RELATED APPLICATIONS

The present application is a National Stage of International Application No. PCT/CN2019/104198, filed Sep. 3, 2019, which claims the priority from Chinese Patent Application No. 201811234791.9, filed with the Chinese National Intellectual Property Administration on Oct. 23, 2018 and entitled "Handover Method, Handover Device and Computer Readable Storage Medium", the entire content of which is hereby incorporated by reference.

FIELD

The present application relates to the field of communication technology, and in particular to a handover method, a handover device and a computer readable storage medium.

BACKGROUND

In the Long Term Evolution (LTE) system, the access network consists of multiple eNodebs (base stations). The eNodeB and Evolved Packet Core (EPC) are connected through the S1 interface, and the eNodeBs are connected through the X2 interface. In order to support the higher data throughput, a User Equipment (UE) can achieve the dual connectivity through two eNodeBs. In the 5G system, similarly, similar to the dual connectivity of the LTE system, it also supports the Tight Interworking between the eNodeB and gNB (base station) as well as the dual connectivity between UE and gNB and gNB. In the current specification, it supports the handover from dual connectivity to dual connectivity and from single connectivity to dual connectivity during the handover process.

However, if a handover from single/dual connectivity to dual connectivity occurs, it means that the preparation process for this handover is relatively long, which may cause the failure of the handover. Then, how to avoid the handover failure in a scenario where both the UE and the network side device (such as base station) support the dual connectivity is a problem which urgently needs to be solved.

SUMMARY

Embodiments of the present application provide a handover method, a handover device and a computer readable storage medium, to avoid the handover failure in a scenario where both the UE and the network side device (such as base station) support the dual connectivity.

In one embodiment of the present application provides a handover method, which is applicable to the source base station side and may include:
  determining a target cell for a user equipment, UE;
  transmitting a handover request message to a target base station where the target cell is located, the handover request message carrying first indication information, and the first indication information is for indicating a suggestion of not establishing a dual connectivity between the target cell and the UE;
  receiving a handover response message sent by the target base station, the handover response message carrying second indication information, and the second indication information is for indicating whether the dual connectivity is established between the target cell and the UE; and the target base station determines whether to establish the dual connectivity between the target cell and the UE at least according to the first indication information;
  sending a handover command to the UE.

In one embodiment of the present application further provides a handover method, which is applicable to the target base station side and may include:
  receiving a handover request message sent by a source base station where a source cell is located, the handover request message carrying first indication information, and the first indication information is for indicating a suggestion of not establishing a dual connectivity between a target cell and a user equipment, UE;
  determining whether to establish the dual connectivity between the target cell and the UE at least according to the first indication information;
  sending a handover response message to the source cell, the handover response message carrying second indication information, and the second indication information is for indicating whether the dual connectivity is established between the target cell and the UE.

In one embodiment of the present application provides a first handover device, such as a source base station, including:
  a processing device, configured to determine a target cell for a user equipment, UE;
  a transmitting device, configured to transmit a handover request message to a target base station where the target cell is located, the handover request message carrying first indication information, and the first indication information is for indicating a suggestion of not establishing a dual connectivity between the target cell and the UE;
  a receiving device, configured to receive a handover response message sent by the target base station, the handover response message carrying second indication information, and the second indication information is for indicating whether the dual connectivity is established between the target cell and the UE; and the target base station determines whether to establish the dual connectivity between the target cell and the UE at least according to the first indication information.

In one embodiment of the present application provides a second handover device, such as a source base station, including:
  a memory configured to store program instructions;
  a processor configured to invoke the program instructions stored in the memory, and in accordance with the obtained program, perform the process of:
  determining a target cell for a user equipment, UE;
  transmitting a handover request message to a target base station where the target cell is located, the handover request message carrying first indication information, and the first indication information is for indicating a suggestion of not establishing a dual connectivity between the target cell and the UE;
  receiving a handover response message sent by the target base station, the handover response message carrying second indication information, and the second indication information is for indicating whether the dual connectivity is established between the target cell and the UE; and the target base station determines whether to establish the dual connectivity between the target cell and the UE at least according to the first indication information;

sending a handover command to the UE.

In one embodiment of the present application provides a third handover device, such as a target base station, including:
- a receiving device, configured to receive a handover request message sent by a source base station where a source cell is located, the handover request message carrying first indication information, and the first indication information is for indicating a suggestion of not establishing a dual connectivity between a target cell and a user equipment, UE;
- a processing device, configured to determine whether to establish the dual connectivity between the target cell and the UE at least according to the first indication information;
- a sending device, configured to send a handover response message to the source cell, the handover response message carrying second indication information, and the second indication information is for indicating whether the dual connectivity is established between the target cell and the UE.

In one embodiment of the present application provides a fourth handover device, such as a target base station, including:
- a memory configured to store program instructions;
- a processor configured to invoke the program instructions stored in the memory, and in accordance with the obtained program, perform the process of:
- receiving a handover request message sent by a source base station where a source cell is located, the handover request message carrying first indication information, and the first indication information is for indicating a suggestion of not establishing a dual connectivity between a target cell and a user equipment, UE;
- determining whether to establish the dual connectivity between the target cell and the UE at least according to the first indication information;
- sending a handover response message to the source cell, the handover response message carrying second indication information, and the second indication information is for indicating whether the dual connectivity is established between the target cell and the UE.

In one embodiment of the present application provides a computer readable storage medium storing computer executable instructions which are configured to cause the computer to perform any one of the above-mentioned handover methods.

The present application has the following beneficial effects.

Embodiments of the present application provide a handover method, a handover device and a computer readable storage medium, where the target cell can be provided with a suggestion when determining whether the target cell establishes the dual connectivity with the UE by carrying the first indication information in the handover request message sent by the source base station to the target base station. Thus, it can be beneficial to prevent the target cell from establishing a dual connectivity between the target cell and the UE, when this cell handover is urgent, and thus the cell handover can be performed immediately, to facilitate reducing the probability of handover failure and improving the user experience.

DETAILED DESCRIPTION OF THE EMBODIMENTS

The embodiments of a handover method, a handover device and a computer readable storage medium provided by embodiments of the present application will be illustrated below in details with reference to the drawings. It is necessary to note that the described embodiments are only a part of embodiments of the present application, but not all embodiments.

In order to facilitate understanding, the terms mentioned in the embodiments of the present application will be explained at first.

Tight Interworking between eNodeB and gNB.

In this scenario, there are mainly two cases as follows: in the first case, the LTE can be used as a primary base station, and the 5G base station can be used as a secondary base station that is connected to the core network through the primary base station. In the second case, the LTE can be used as a primary base station, the 5G base station can be used as a secondary base station, and both the primary base station and the secondary base station are connected to the 5G core network. And, in the second case, the NR-RN DC architecture is also included.

Figure 1:
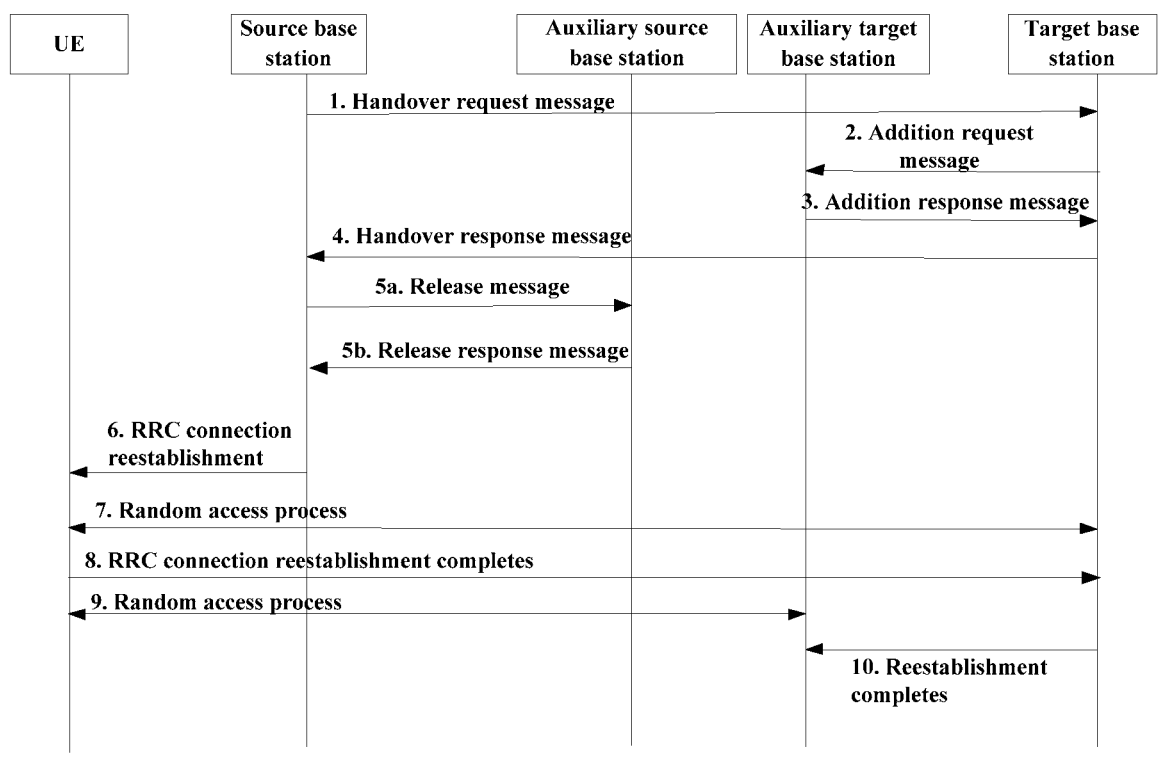
FIG. 1 is an interactive flow chart among user equipment, source base station and target base station, provided by the prior art.

The process can be as shown in FIG. 1 if a dual connectivity is added in the handover process when the UE is performing the cell handover. Here, after receiving a handover request message sent by the source base station, the target base station decides whether to establish a dual connectivity according to the bearer information carried in the handover request message. If a dual connectivity needs to be established between the target cell and the UE, and there is a suitable secondary target base station, the target base station will initiate an SN addition (addition request message) process to the secondary target base station. After the target base station receives a response from the secondary target base station, the target base station sends a handover response message to the source base station.

Considering that the average delay of the X2/Xn interface is 10 ms, if the target base station is in the CU/DU separation scene, there is also an additional F1 interface signaling that needs to be exchanged. If the processing time delay of the base station is taken into consideration, adding a secondary target base station during the handover process will cause an additional the time of nearly 100 ms for the handover preparation process. If the cell handover is urgent, that is, when the signal quality of the source base station is already very poor, the establishing a dual connectivity between the target cell and the UE may cause this cell handover to fail, and affect the user experience.

Therefore, an embodiment of the present application provides a handover method to reduce the probability of cell handover failure and improve the user experience.

In one embodiment, a handover method provided by an embodiment of the present application may include the following steps.

Step 1: a source base station determines a target cell for a UE.

Here, the source base station can be understood as the base station where the source cell is located. The source base station, the base station where the source cell is located, and the source cell all represent the source side in the cell handover process, that is, the side that sends the handover request message. And, in embodiments of the present application, the three of them can all represent the same meaning, and the three of them can be used interchangeably.

In addition, before determining the target cell, the source base station may receive a measurement message sent by the UE, and the measurement message includes the identifier of the source base station and the quality information of radio links of surrounding cells. That is, the UE may measure the quality of radio links of surrounding cells and then summarize the measurement results and send them to the source base station, so that the source base station selects a target cell that meets the conditions according to the measurement results.

Here, the target cell that meets the conditions can be understood as: the quality of the radio link of the target cell is better, which can improve the high-quality services. The process of determining the target cell according to the measurement message can refer to the prior art, which will not be repeated here.

Step 2: the source base station sends a handover request message to the target base station, where the target cell is located, the handover request message carries the first indication information, and the first indication information is for indicating a suggestion of not establishing a dual connectivity between the target cell and the UE.

Here, the target base station can be understood as the base station where the target cell is located. The target base station, the base station where the target cell is located, and the target cell all represent the target side in the cell handover process, that is, the side that receives the handover request message and sends the handover response message. And, in embodiments of the present application, the target base station, the base station where the target cell is located, and the target cell can represent the same meaning, and the three of them can be used interchangeably.

It should be noted that, the source base station can determine whether the cell handover process needs to be performed immediately according to the measurement message reported by the UE after the source base station determines the target cell and before sending the handover request message. Whether the cell handover process is urgent, that is, whether the quality of the service signal provided by the source base station has become relatively poor so that the long handover preparation time cannot be given.

If so, the source base station needs to carry the first indication information in the handover request message sent to the target base station, to give a suggestion to the target base station to suggest the target base station not to establish a dual connectivity with the UE, reducing the handover preparation time, avoiding the cell handover failure, and ensuring the smooth progress of the handover.

If not, the source base station may not carry the first indication information in the handover request message sent to the target base station, so that the target base station determines whether a dual connectivity needs to be established according to the type of the UE and its own load; or the source base station may also carry the first indication information in the handover request message sent to the target base station, which is not limited here.

Step 3: the target base station receives the handover request message sent by the source base station.

Step 4: the target base station determines whether to establish the dual connectivity between the target cell and the UE at least according to the first indication information.

In one embodiment, when determining whether to establish the dual connectivity between the target cell and the UE, the target base station not only needs to consider the first indication information but also can consider the service type of the UE and a load condition of the target base cell to ensure the smooth progress of the cell handover.

Therefore, in an embodiment of the present application, the target base station determines whether to establish the dual connectivity between the target cell and the UE at least according to the first indication information, which may include:

the target base station determines whether to establish the dual connectivity between the target cell and the UE according to the first indication information, the type of the UE and the load of the target cell.

In some embodiments, when the target base station determines whether to establish the dual connectivity between the target cell and the UE, there are two determination results as follows.

One result is that there is no need to establish a dual connectivity between the target cell and the UE. At this time, the target base station may send a handover response message to the source base station, and carry second indication information in the handover response message. And, the second indication information is used to indicate that the target base station has not established a dual connectivity with the UE, to inform the source base station that the target base station does not established a dual connectivity with the UE.

Another result is that a dual connectivity can be established between the target cell and the UE. At this time, the target base station needs to perform the operation of establishing a dual connectivity between the target cell and the UE. The steps are as follows:

determining a secondary target cell for the UE;

sending an addition request message to the secondary target base station where the secondary target cell is located;

receiving an addition response message sent by the secondary target base station where the secondary target cell is located.

Here, since the target base station has established a dual connectivity, the UE will realize the dual connectivity with the target cell and the secondary target cell during this cell handover, to provide more services to the UE.

After performing the operation of establishing the dual connectivity, the target base station may send a handover response message to the source base station, and carry the second indication information in the handover response message. At this time, the second indication information is used to indicate that the target base station has established the dual connectivity, to inform the source base station that the target base station has established the dual connectivity.

Therefore, when determining whether to establish the dual connectivity between the target cell and the UE, the target base station needs to perform the process of step 5 below no matter which of the above-mentioned results is the determined.

Step 5: the target base station sends a handover response message to the source cell, the handover response message carries the second indication information that is used to indicate whether the target cell establishes a dual connectivity with the UE.

Step 6: the source base station receives the handover response message sent by the base station.

Step 7: the source base station sends a handover command to the UE.

Step 8: the UE receives the handover command, and performs the cell handover according to the handover command.

Here, the handover command can carry the information (such as identifier, etc.) of the target cell. If a dual connectivity is required, the handover command can also carry the information (such as identifier, etc.) of the secondary target cell, to inform the UE of whether to perform the dual connectivity operation during this cell handover.

Of course, the handover command may also directly carry the above-mentioned second indication information, to directly inform the UE of whether to perform the dual connectivity operation, which is not limited here.

Here, the process in which the UE performs the cell handover according to the handover command and the process in which the target base station establishes a dual connectivity can refer to the prior art, which will not be repeated here.

In some embodiments, during the cell handover process, the handover may succeed, but it may also fail. If this cell handover fails, the UE can send a radio link failure notification to the source base station to notify the source base station that the handover failed, so that the source base station can optimize the handover parameters; and the UE will also record the information on whether the target base station has established a dual connectivity for the UE in the failure process of this cell handover, to provide a reference for the subsequent optimization of the handover parameters.

In some embodiments, there may be many ways for the UE to notify the source base station of the failure of this cell handover.

In a first way, the UE determines that the source base station is a reestablishment base station. The UE can directly send a radio link failure notification to the source base station. That is, the UE directly informs the source base station that this cell handover failed, and the source base station can determine the reason for the failure of this cell handover according to the radio link failure notification. And, the UE may perform a Radio Resource Control (RRC) connection reestablishment process with the source base station.

In some embodiments, the source base station may send a radio link failure request message to the UE, so that the UE reports the recorded Radio Link Failure (RLF) related information, That is, the source base station instructs the UE to send a radio link failure message, the radio link failure message may include the third indication information that is used to indicate whether the target cell establishes a dual connectivity with the UE during the cell handover process.

For the source base station, it can optimize the handover parameters according to the received radio link failure message.

In a second way, the UE determines that the source base station is a reestablishment base station. The UE can directly send a radio link failure notification to the source base station. That is, the UE directly informs the source base station that this cell handover failed, and the UE and the source base station perform the RRC connection reestablishment process.

However, the difference between the second way and the first way is: the source base station has received the handover response message sent by the target base station carried the second indication information, and the second indication information is used to indicate whether the target cell to establish a dual connectivity, so the source base station has already known whether the target base station has established a dual connectivity, Thus, the source base station can determine the cause of the failure of this cell handover, and thus the source base station does not need to send the radio link failure request message to the UE, that is, the UE does not need to report the recorded RLF related information, and the source base station can optimize the handover parameters of the UE according to the second indication information and the information of the target cell, improving the optimization processing efficiency.

In a third way, the UE determines that a base station other than the source base station is a reestablishment base station, and sends a radio link failure notification to the reestablishment base station, so that the reestablishment base station can determine the cause of the failure of this cell handover according to the radio link failure notification. The UE performs the RRC connection reestablishment process with the reestablishment base station, and then notifies the source base station of the failure of this cell handover and the cause of the handover failure through the reestablishment base station. That is, the UE indirectly informs the source base station of the failure of this cell handover through the reestablishment base station, so that the source base station performs the optimization of handover parameters.

In some embodiments, in this case, the reestablishment base station is not the source base station and does not know whether the target base station has established a dual connectivity, so the reestablishment base station sends a radio link failure request message to the UE so that the UE reports the recorded RLF related information. That is, the reestablishment base station instructs the UE to send a radio link failure message, and the radio link failure message may include the third indication information that is used to indicate whether the target cell establishes a dual connectivity during the cell handover process.

Figure 2:
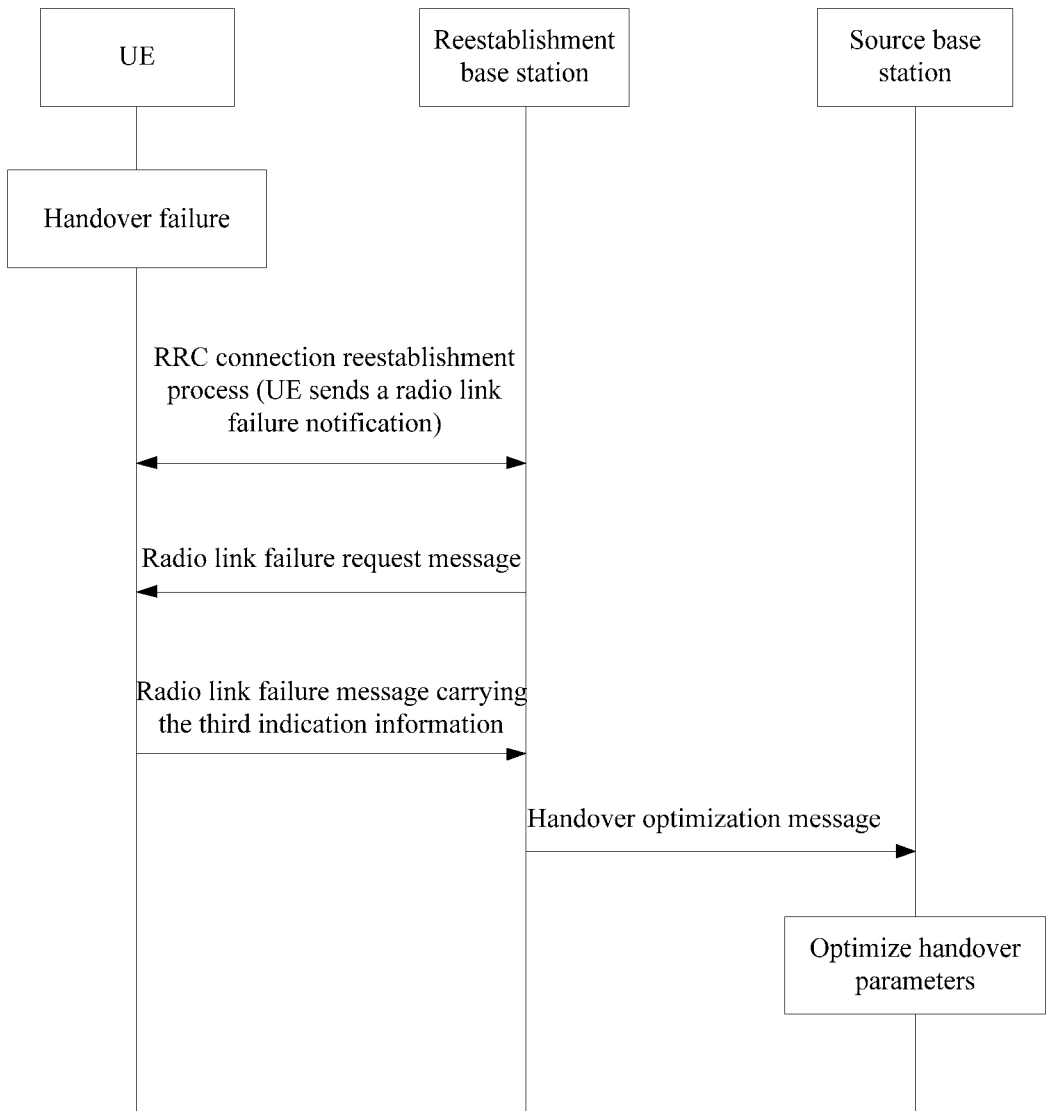
FIG. 2 is an interactive flow chart of notifying the source base station to optimize handover parameters after the cell handover fails, provided by an embodiment of the present application.

Of course, the radio link failure message may also include the information of the source base station, so that the reestablishment base station can send a handover optimization message to the source base station, so that the source base station optimizes the handover parameters according to the received handover optimization message. The process of this method can be as shown in FIG. 2.

It should be pointed out that, for the source base station, how to optimize the handover parameters can refer to the prior art, which will not be repeated here.

The handover method provided in embodiments of the present application will be described below in combination with embodiments.

Figure 3:
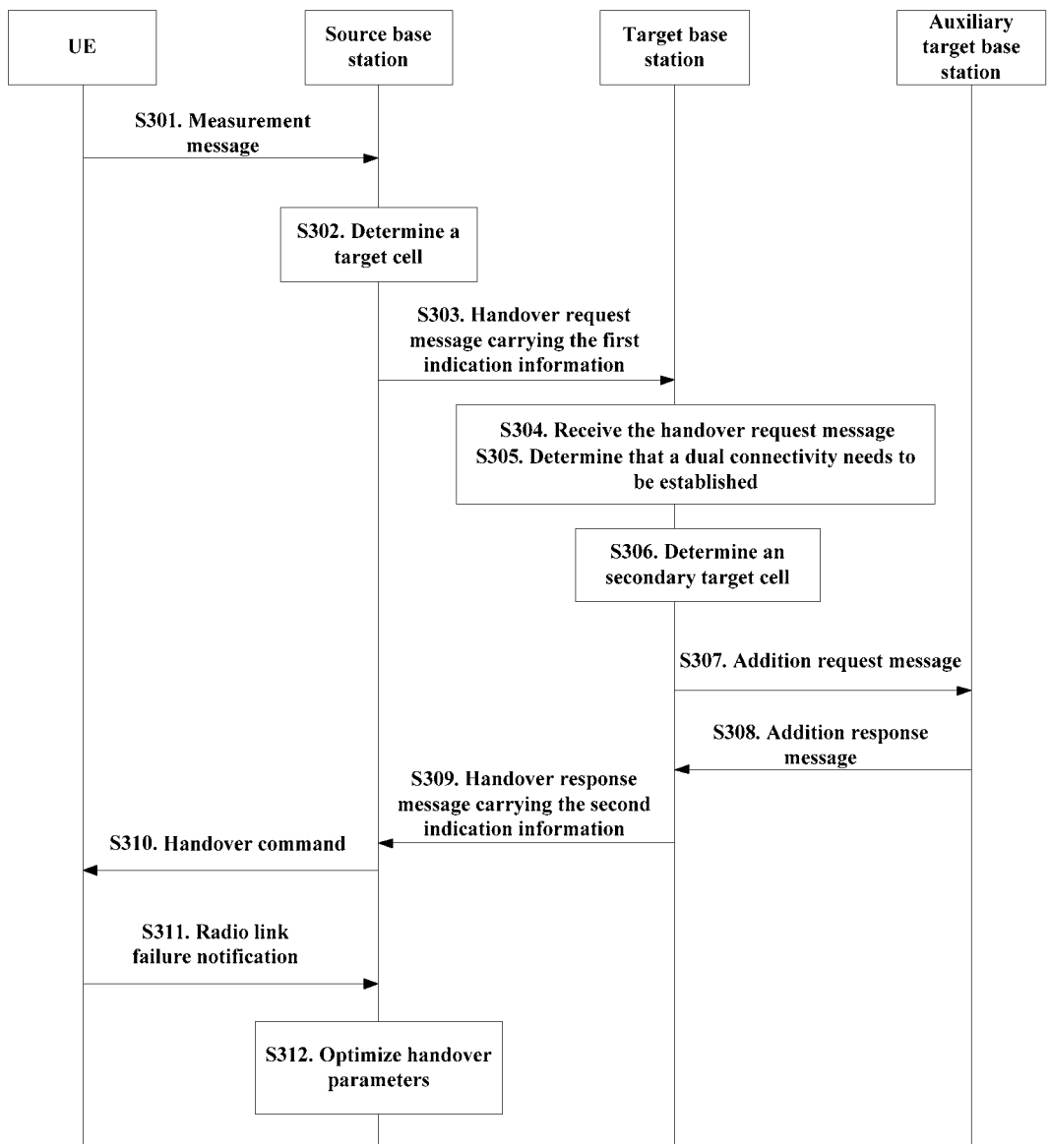
FIG. 3 is an interactive flow chart of a first handover method provided by an embodiment of the present application.

Referring to FIG. 3, the handover request message carries the first indication information, the target base station establishes a dual connectivity, and the cell handover fails as an example for description:

S301: a UE sends a measurement message to a source base station;

S302: the source base station determines a target cell for the UE according to the measurement message;

S303: the source base station sends a handover request message carrying the first indication information to the target base station;

S304: the target base station receives the handover request message;

S305: the target base station determines that a dual connectivity needs to be established according to the first indication information carried in the handover request message, the type of the UE, and its own load;

S306: the target base station determines a secondary target cell for the UE;

S307: the target base station sends an addition request message to the secondary target base station where the secondary target cell is located;

S308: the secondary target base station where the secondary target cell is located sends an addition response message to the target base station;

S309: the target base station sends a handover response message carrying the second indication information to the source base station;

S310: the source base station sends a handover command to the UE;

S311: the UE fails in this cell handover and sends a radio link failure notification to the source base station;

S312: the source base station optimizes the handover parameters according to the second indication information and the information of the target cell.

Figure 4:
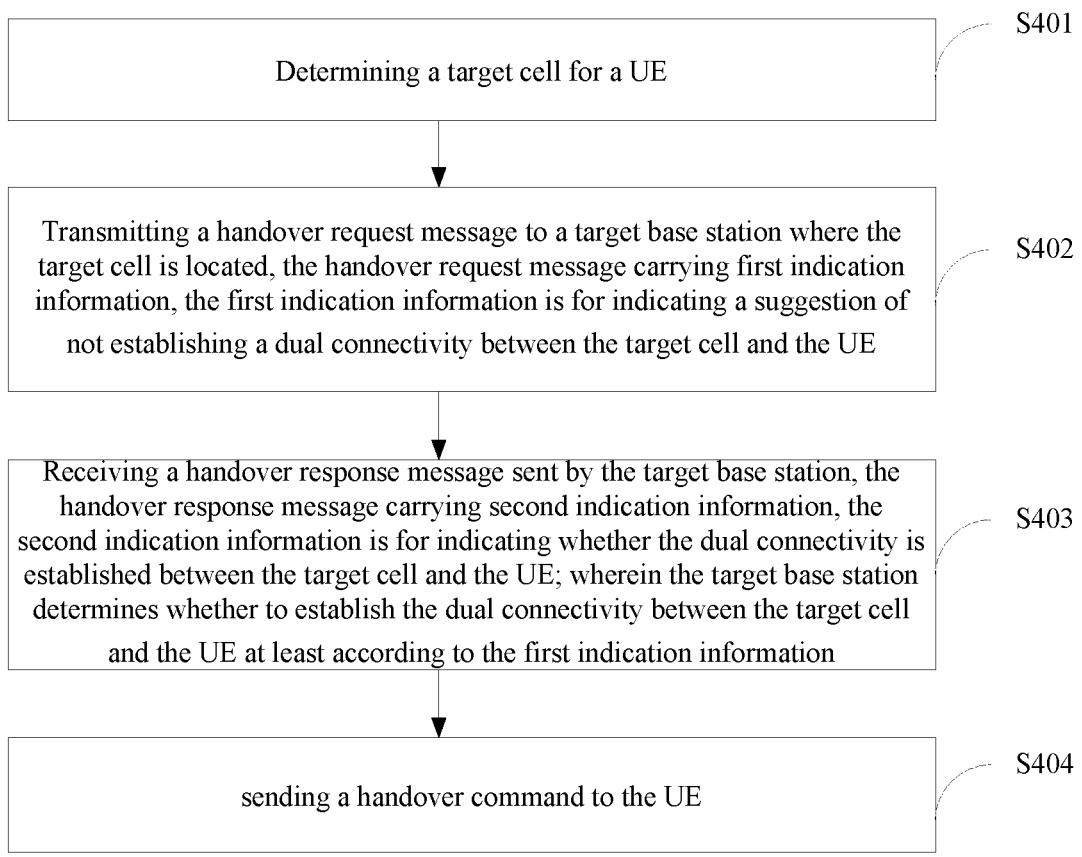
FIG. 4 is a flow chart of a second handover method provided by an embodiment of the present application.

One embodiment of the present application further provides a handover method applicable to the source base station side, as shown in FIG. 4, which may include:

S401: determining a target cell for a user equipment, UE;

S402: transmitting a handover request message to a target base station where the target cell is located, the handover request message carrying first indication information, and the first indication information is for indicating a suggestion of not establishing a dual connectivity between the target cell and the UE;

S403: receiving a handover response message sent by the target base station, the handover response message carrying second indication information, and the second indication information is for indicating whether the dual connectivity is established between the target cell and the UE;

Here, the target base station determines whether to establish the dual connectivity between the target cell and the UE at least according to the first indication information;

S404: sending a handover command to the UE.

In embodiments of the present application, the target cell can be provided with a suggestion when determining whether the target cell establishes a dual connectivity by carrying the first indication information in the handover request message sent by the source base station to the target base station, so that it can be beneficial to prevent the target cell from establishing a dual connectivity when this cell handover is urgent, and thus the cell handover can be performed immediately, to facilitate reducing the probability of handover failure and improving the user experience.

In one embodiment, before the step S401 of determining the target cell for the UE in embodiments of the present application, the method may further include:

receiving a measurement message sent by the UE.

The step S402 of sending the handover request message to the target base station where the target cell is located, the handover request message carries the first indication information in embodiments of the present application, may include:

determining that this cell handover process needs to be performed immediately according to the measurement message, and then sending the handover request message to the target base station where the target cell is located, and the handover request message carries the first indication information.

Thus, when this cell handover needs to be performed immediately, the target cell can be provided with a suggestion, to facilitate the smooth progress of this cell handover.

In some embodiments, after the step S404, the handover method may further include:

optimizing a handover parameter of the UE according to the second indication information and the information of the target cell, when a cause of failure of a cell handover process is determined according to a radio link failure notification sent by the UE.

Thus, when this cell handover fails, the handover parameters can be quickly optimized to improve the efficiency of handover optimization.

In some embodiments, after the step S404, the handover method may further include:

instructing the UE to send a radio link failure message, when a cause of failure of a cell handover process is determined according to a radio link failure notification sent by the UE;

receiving the radio link failure message sent by the UE, the radio link failure message comprising third indication information, and the third indication information is for indicating whether the dual connectivity is established between the target cell and the UE during the cell handover process;

optimizing a handover parameter of the UE according to the radio link failure message.

Therefore, it is also possible to optimize the handover parameters according to the radio link failure message (that is, the aforementioned RLF related information) reported by the UE to ensure the smooth progress of the optimization process.

In some embodiments, the radio link failure message may further include: the information of a source cell.

In some embodiments, the target base station where the target cell is located determines whether to establish the dual connectivity between the target cell and the UE at least according to the first indication information, by:

the target base station where the target cell is located determines whether to establish the dual connectivity between the target cell and the UE according to the first indication information, the service type of the UE and the load of the target cell.

Thus, the base station where the target cell is located can be comprehensively measured and considered to reduce the probability of handover failure.

Figure 5:
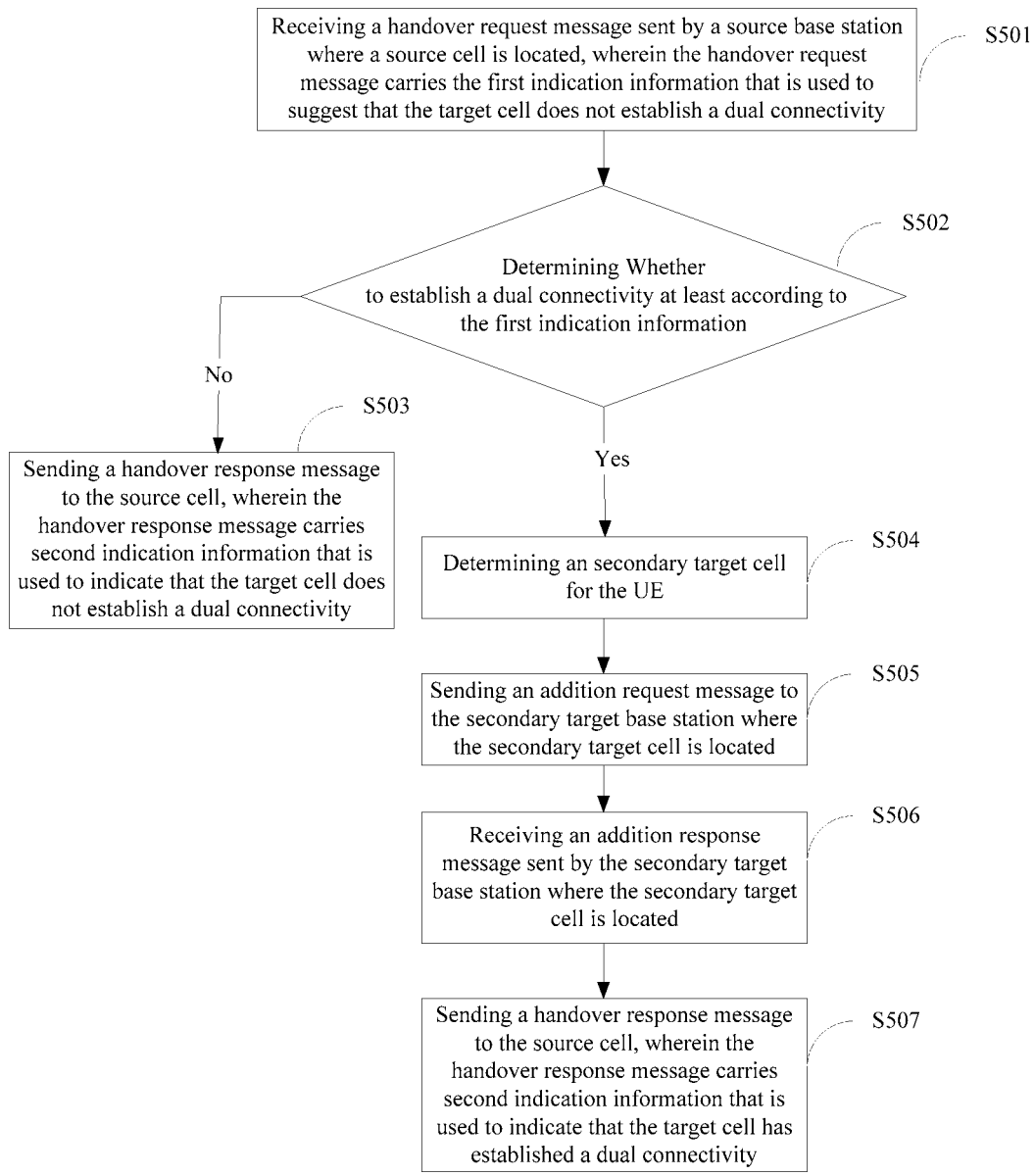
FIG. 5 is a flow chart of a third handover method provided by an embodiment of the present application.

An embodiment of the present application further provides a handover method applicable to the target base station side, as shown in FIG. 5, which may include:

S501: receiving a handover request message sent by a source base station where a source cell is located, the handover request message carrying first indication information, and the first indication information is for indicating a suggestion of not establishing a dual connectivity between a target cell and a user equipment, UE;

S502: determining whether to establish the dual connectivity between the target cell and the UE at least according to the first indication information; if not, performing step S503; if so, performing step S504;

S503: sending a handover response message to the source cell, the handover response message carrying second indication information, and the second indication information is for indicating whether the dual connectivity is established between the target cell and the UE;

S504: determining a secondary target cell for the UE;

S505: sending an addition request message to the secondary target base station where the secondary target cell is located;

S506: receiving an addition response message sent by the secondary target base station where the secondary target cell is located;

S507: sending a handover response message to the source cell, the handover response message carrying second indication information, where the second indication information is for indicating the target cell has established a dual connectivity with the UE.

In some embodiments, the step S502 of determining whether the target cell establishes the dual connectivity with the UE at least according to the first indication information may include:

determining, by the target base station, whether to establish the dual connectivity between the target cell and the UE according to the first indication information, the service type of the UE, and the load of the target base station where the target cell is located.

Thus, the target cell can be comprehensively measured and considered to reduce the probability of handover failure.

An embodiment of the present application further provides a handover device, such as a source base station. Since the working principle of the handover device is similar to that of the aforementioned handover method applicable to the source base station, the implementations of the handover device can refer to the embodiments of the handover method described above, and the repeated description thereof will be omitted here.

Figure 6:
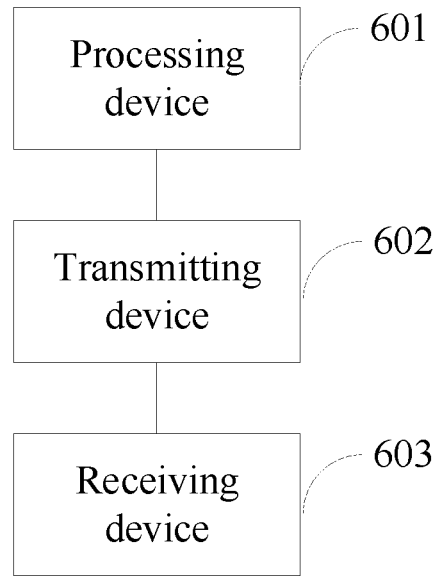
FIG. 6 is a structural schematic diagram of a first handover device provided by an embodiment of the present application.

Embodiments of the present application provide a handover device, such as a source base station, as shown in FIG. 6, which may include:

a processing device 601 configured to determine a target cell for a user equipment, UE;

a transmitting device 602 configured to transmit a handover request message to a target base station where the target cell is located, the handover request message carrying the first indication information, where the first indication information is for indicating a suggestion of not establishing a dual connectivity between the target cell and the UE;

a receiving device 603 configured to receive a handover response message sent by the target base station, the handover response message carrying the second indication information, where the second indication information is for indicating whether the dual connectivity is established between the target cell and the UE; and the target base station determines whether to establish the dual connectivity between the target cell and the UE at least according to the first indication information.

In some embodiments, the receiving device 603 is further configured to receive a measurement message sent by the UE before determining the target cell for the UE;

the transmitting device 602 is further configured to determine that a cell handover process needs to be performed immediately according to the measurement message, and then transmit the handover request message to the target base station where the target cell is located, the handover request message carrying the first indication information.

In some embodiments, the processing device 601 is further configured to optimize handover parameters of the UE according to the second indication information and the information of the target cell, when the cause of failure of this cell handover is determined according to a radio link failure notification sent by the UE.

In some embodiments, the processing device 601 is further configured to instruct the UE to send a radio link failure message, when the cause of failure of this cell handover is determined according to a radio link failure notification sent by the UE; and optimize handover parameters according to the radio link failure message;

the receiving device 603 is further configured to receive the radio link failure message sent by the UE, the radio link failure message includes the third indication information, and the third indication information is for indicating whether the dual connectivity is established between the target cell and the UE during the cell handover process.

In some embodiments, the radio link failure message further includes: the information of a source cell.

An embodiment of the present application further provides a handover device, such as a target base station. Since the working principle of the handover device is similar to that of the aforementioned handover method applicable to the target base station, the implementations of the handover device can refer to embodiments of the handover method described above, and the repeated description thereof will be omitted here.

Figure 7:
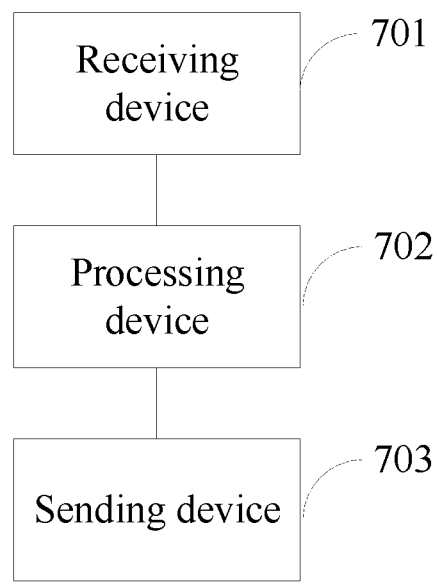
FIG. 7 is a structural schematic diagram of a second handover device provided by an embodiment of the present application.

Embodiments of the present application provide a handover device, such as a target base station, as shown in FIG. 7, which may include:

a receiving device 701 configured to receive a handover request message sent by a source base station where a source cell is located, the handover request message carrying the first indication information, where the first indication information is for indicating a suggestion of not establishing a dual connectivity between a target cell and a user equipment, UE;

a processing device 702 configured to determine whether to establish the dual connectivity between the target cell and the UE at least according to the first indication information;

a sending device 703 configured to send a handover response message to the source cell, the handover response message carrying the second indication information, where the second indication information is for indicating whether the dual connectivity is established between the target cell and the UE.

In some embodiments, the processing device 702 is further configured to determine whether to establish the dual connectivity between the target cell and the UE according to the first indication information, the service type of the UE, and the load situation of a target base station where the target cell is located.

In some embodiments, the processing device 702 is further configured to determine a secondary target cell for the UE after determining that a dual connectivity needs to be established;

the sending device 703 is further configured to send an addition request message to the secondary target base station where the secondary target cell is located;

the receiving device 701 is further configured to receive an addition response message sent by the secondary target base station where the secondary target cell is located.

Figure 8:
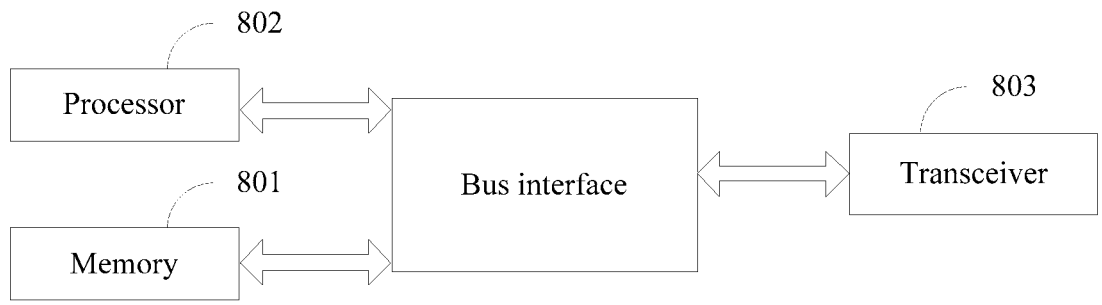
FIG. 8 is a structural schematic diagram of a third handover device provided by an embodiment of the present application.

An embodiment of the present application further provides a handover device, such as a source base station, as shown in FIG. 8, which may include:

a memory 801 configured to store program instructions;

a processor 802 configured to invoke the program instructions stored in the memory 801, and in accordance with the obtained program, perform the process of:

determining a target cell for a user equipment, UE;

transmitting a handover request message to a target base station where the target cell is located via a transceiver 803, the handover request message carrying the first indication information, and the first indication information is for indicating a suggestion of not establishing a dual connectivity between the target cell and the UE;

receiving a handover response message sent by the target base station via the transceiver 803, the handover response message carrying the second indication information, where the second indication information is for indicating whether the dual connectivity is established between the target cell and the UE; and the target base station determines whether to establish the dual connectivity between the target cell and the UE at least according to the first indication information;

sending a handover command to the UE via the transceiver 803.

In some embodiments, the transceiver 803 may be configured to receive and send data under the control of the processor 802.

Here, in FIG. 8, the bus architecture may include any numbers of interconnected buses and bridges, and the interconnected buses and the bridges are linked together by various circuits of one or more processors represented by the processor 802 and the memory represented by the memory 801. The bus architecture may further link various other circuits such as peripheral device, voltage regulator and power management circuit, which are all well known in the art and thus will not be further described again herein. The bus interface provides an interface. The transceiver 803 can be a number of elements, i.e., include a transmitter and a receiver, and provide the devices for communicating with various other devices over the transmission media. For different user equipment, the user interface can also be an external or internal interface for connecting with the interface of the connected devices, and the connected devices include but not limited to keypad, display, loudspeaker, microphone, joystick and the like.

The processor 802 is responsible for managing the bus architecture and general processing, and the memory 801 may store the data used by the processor 802 when performing the operations.

The processor 802 in embodiments of the present application may be Central Processing Unit (CPU), Application Specific Integrated Circuit (ASIC), Field-Programmable Gate Array (FPGA) or Complex Programmable Logic Device (CPLD).

Figure 9:
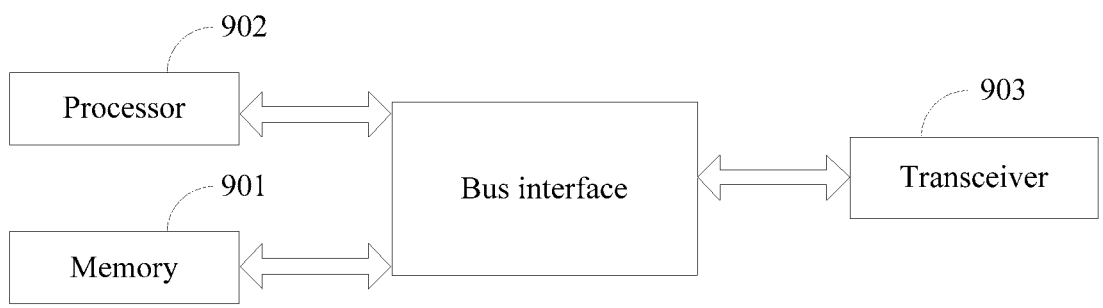
FIG. 9 is a structural schematic diagram of a fourth handover device provided by an embodiment of the present application.

An embodiment of the present application further provides a handover device, such as a target base station, as shown in FIG. 9, which may include:

a memory 901 configured to store program instructions;

a processor 902 configured to invoke the program instructions stored in the memory 901, and in accordance with the obtained program, perform the process of:

receiving a handover request message sent by a source base station where a source cell is located via a transceiver 903, the handover request message carrying the first indication information, where the first indication information is for indicating a suggestion of not establishing a dual connectivity between a target cell and a user equipment, UE;

determining whether to establish the dual connectivity between the target cell and the UE at least according to the first indication information;

sending a handover response message to the source cell via the transceiver 903, the handover response message carrying the second indication information, where the second indication information is for indicating whether the dual connectivity is established between the target cell and the UE.

In some embodiments, the transceiver 903 may be configured to receive and send data under the control of the processor 902.

Here, in FIG. 9, the bus architecture may include any numbers of interconnected buses and bridges, and the interconnected buses and the bridges are linked together by various circuits of one or more processors represented by the processor 902 and the memory represented by the memory 901. The bus architecture may further link various other circuits such as peripheral device, voltage regulator and power management circuit, which are all well known in the art and thus will not be further described again herein. The bus interface provides an interface. The transceiver 903 can be a number of elements, i.e., include a transmitter and a receiver, and provide the devices for communicating with various other devices over the transmission media. For different user equipment, the user interface can also be an external or internal interface for connecting with the interface of the connected devices, and the connected devices include but not limited to keypad, display, loudspeaker, microphone, joystick and the like.

The processor 902 is responsible for managing the bus architecture and general processing, and the memory 901 may store the data used by the processor 902 when performing the operations.

The processor 902 in embodiments of the present application may be Central Processing Unit (CPU), Application Specific Integrated Circuit (ASIC), Field-Programmable Gate Array (FPGA) or Complex Programmable Logic Device (CPLD).

It should be pointed out that, any memory mentioned in embodiments of the present application may include Read-Only Memory (ROM) and Random Access Memory (RAM), and provide the processor with the program instructions and data stored in the memory. In an embodiment of the present application, the memory may be used to store the program of any method provided by embodiments of the present application. The processor invokes the program instructions stored in the memory and is configured to perform any method provided by embodiments of the present application in accordance with the obtained program instructions.

Based on the same concept, an embodiment of the present application further provides a computer readable storage medium storing computer executable instructions which are configured to cause the computer to perform any handover method described above.

The readable storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, non-transitory memory (NAND FLASH), Solid State Disk (SSD)) or the like.

It is necessary to note that, the user equipment mentioned in embodiments of the present application may also referred to as terminal, Mobile Station ("MS" for short), Mobile Terminal or the like. In some embodiments, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The base station may be an access network device (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in embodiments of the disclosure.

The processing flows of the above methods may be implemented by a software program, which may be stored in a storage medium. When the stored software program is invoked, the above method steps are performed.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although embodiments of the present application have been described, additional alterations and modifications to these embodiments. Thus the attached claims are intended to be interpreted to include the embodiments as well as all the alterations and modifications falling within the scope of the present application.

Embodiments of the present application provide a handover method, a handover device and a computer readable storage medium, where the target cell can be provided with a suggestion when determining whether the target cell establishes a dual connectivity with the UE by carrying the first indication information in the handover request message sent by the source base station to the base station, so that it can be beneficial to prevent the target cell from establishing a dual connectivity when this cell handover is urgent, and thus the cell handover can be performed immediately, to facilitate reducing the probability of handover failure, and improving the user experience.

What is claimed is:

1. A handover method, comprising:
   determining a target cell for a user equipment, UE;
   transmitting a handover request message to a target base station where the target cell is located, the handover request message carrying first indication information, wherein the first indication information is for indicating a suggestion of not establishing a dual connectivity between the target cell and the UE;
   receiving a handover response message sent by the target base station, the handover response message carrying second indication information, wherein the second indication information is for indicating whether the dual connectivity is established between the target cell and the UE; wherein the target base station determines whether to establish the dual connectivity between the target cell and the UE at least according to the first indication information;
   sending a handover command to the UE;
   wherein the method further comprises:
   optimizing a handover parameter of the UE according to the second indication information and information of the target cell, when a cause of failure of a cell handover process is determined according to a radio link failure notification sent by the UE.

2. The handover method according to claim 1, wherein:
   before said determining the target cell for the UE, the method further comprises:
   receiving a measurement message sent by the UE; and said transmitting the handover request message to the target base station where the target cell is located, the handover request message carrying first indication information, comprises:
  determining that a cell handover process needs to be performed immediately according to the measurement message; and
  transmitting the handover request message to the target base station where the target cell is located, the handover request message carrying the first indication information.

3. The method according to claim 1, further comprising:
  instructing the UE to send a radio link failure message, when a cause of failure of a cell handover process is determined according to a radio link failure notification sent by the UE;
  receiving the radio link failure message sent by the UE, the radio link failure message comprising third indication information, wherein the third indication information is for indicating whether the dual connectivity is established between the target cell and the UE during the cell handover process;
  optimizing a handover parameter of the UE according to the radio link failure message.

4. The method according to claim 3, wherein the radio link failure message further comprises:
  information of a source cell.

5. The method according to claim 1, wherein the target base station determines whether to establish the dual connectivity between the target cell and the UE at least according to the first indication information, by:
  determining, by the target base station, whether to establish the dual connectivity between the target cell and the UE according to the first indication information, a service type of the UE and a load of the target cell.

6. A handover method, comprising:
  receiving a handover request message sent by a source base station where a source cell is located, the handover request message carrying first indication information, wherein the first indication information is for indicating a suggestion of not establishing a dual connectivity between a target cell and a user equipment, UE;
  determining whether to establish the dual connectivity between the target cell and the UE at least according to the first indication information;
  sending a handover response message to the source cell, the handover response message carrying second indication information, wherein the second indication information is for indicating whether the dual connectivity is established between the target cell and the UE;
  wherein after determining to establish the dual connectivity between the target cell and the UE, the method further comprises:
  determining a secondary target cell for the UE;
  sending an addition request message to the secondary target base station where the secondary target cell is located;
  receiving an addition response message sent by the secondary target base station where the secondary target cell is located.

7. The method according to claim 6, wherein said determining whether to establish the dual connectivity between the target cell and the UE at least according to the first indication information, comprises:
  determining whether to establish the dual connectivity between the target cell and the UE according to the first indication information, a service type of the UE, and a load of a target base station where the target cell is located.

8. A handover device, the handover device comprises:
  a memory configured to store program instructions;
  a processor, by executing the program instructions, configured to:
  determine a target cell for a user equipment, UE;
  transmit a handover request message to a target base station where the target cell is located, the handover request message carrying first indication information, wherein the first indication information is for indicating a suggestion of not establishing a dual connectivity between the target cell and the UE;
  receive a handover response message sent by the target base station, the handover response message carrying second indication information, wherein the second indication information is for indicating whether the dual connectivity is established between the target cell and the UE; wherein the target base station determines whether to establish the dual connectivity between the target cell and the UE at least according to the first indication information;
  send a handover command to the UE;
  wherein the processer is further configured to:
  optimize a handover parameter of the UE according to the second indication information and information of the target cell, when a cause of failure of a cell handover process is determined according to a radio link failure notification sent by the UE.

9. The handover device according to claim 8, wherein the processer is further configured to:
  receive a measurement message sent by the UE before said determining the target cell for the UE;
  determine that a cell handover process needs to be performed immediately according to the measurement message, and then transmit the handover request message to the target base station where the target cell is located, the handover request message carrying the first indication information.

10. The handover device according to claim 8, wherein the processer is further configured to:
  instruct the UE to send a radio link failure message, when a cause of failure of a cell handover process is determined according to a radio link failure notification sent by the UE;
  receive the radio link failure message sent by the UE, the radio link failure message comprising third indication information, wherein the third indication information is for indicating whether the dual connectivity is established between the target cell and the UE during the cell handover process; and
  optimize a handover parameter of the UE according to the radio link failure message.

11. The handover device according to claim 10, wherein the radio link failure message further comprises: information of a source cell.

12. A handover device, the handover device comprises:
  a memory configured to store program instructions;
  a processor, by executing the program instructions, configured to:
  receive a handover request message sent by a source base station where a source cell is located, the handover request message carrying first indication information, wherein the first indication information is for indicating a suggestion of not establishing a dual connectivity between a target cell and a user equipment, UE;

determine whether to establish the dual connectivity between the target cell and the UE at least according to the first indication information;

send a handover response message to the source cell, the handover response message carrying second indication information, wherein the second indication information is for indicating whether the dual connectivity is established between the target cell and the UE;

wherein the processor is further configured to:

determine a secondary target cell for the UE after determining that a dual connectivity needs to be established;

send an addition request message to the secondary target base station where the secondary target cell is located;

receive an addition response message sent by the secondary target base station where the secondary target cell is located.

13. The handover device according to claim 12, wherein the processer is further configured to:

determine whether to establish the dual connectivity between the target cell and the UE according to the first indication information, a service type of the UE, and a load situation of a target base station where the target cell is located.

14. A non-transitory computer readable storage medium storing a computer program thereon, wherein the program, when being executed by a processor, implements the method of claim 1.

15. A non-transitory computer readable storage medium storing a computer program thereon, wherein the program, when being executed by a processor, implements the method of claim 6.

* * * * *